United States Patent

[11] 3,610,660

| [72] | Inventor | Nathaniel W. Price |
| | | 33 Barker Ave., White Plains, N.Y. 10601 |
| [21] | Appl. No. | 19,762 |
| [22] | Filed | Mar. 16, 1970 |
| [45] | Patented | Oct. 5, 1971 |

[54] BICYCLES AND ACCESSORIES THEREFOR
7 Claims, 10 Drawing Figs.

[52] U.S. Cl. .................................................. 280/289,
244/64, 244/48, 280/220, 280/226, 280/266,
293/61
[51] Int. Cl. ........................................................ B62h 7/00
[50] Field of Search............................................ 280/289,
213, 220, 235, 226, 266, 1.12, 1.21; 244/46, 48,
64; 293/61

[56] References Cited
UNITED STATES PATENTS

| 3,284,096 | 11/1966 | Hansen et al. | 280/289 |
| 3,545,790 | 12/1970 | Davis et al. | 280/289 |
| 1,033,646 | 7/1912 | Wilson | 244/64 X |
| 1,278,462 | 9/1918 | Harris | 244/48 X |
| 607,500 | 7/1898 | Brinton | 280/266 |
| 591,636 | 10/1897 | Richter | 280/266 |
| 1,730,627 | 10/1929 | Rogers | 244/64 |

OTHER REFERENCES

"Aerial Bicycle Foretells Day When Boy May Fly," The Sun, Sunday, Jan. 11, 1920, P. 4 Copy in class 244/64.5

*Primary Examiner*—Benjamin Hersh
*Assistant Examiner*—John P. Silverstrim
*Attorneys*—Lewis H. Eslinger, Alvin Sinderbrand and Curtis, Morris & Safford

ABSTRACT: A bicycle is provided with a wing structure mounted on the forward portion of its frame so as to be pivotal relative to the latter for varying the angle of attack of the wing structure, and such angle of attack is increased in response to rearward shifting of the rider's center of gravity, either by actual displacement of the seat or by movement of the rider along the seat, so that the shifting of the rider's center of gravity and the increased lift of the wing structure combine to raise the front wheel from the ground and to maintain the frame in the resulting tilted position.

PATENTED OCT 5 1971

INVENTOR
NATHANIEL W. PRICE

BY

ATTORNEY

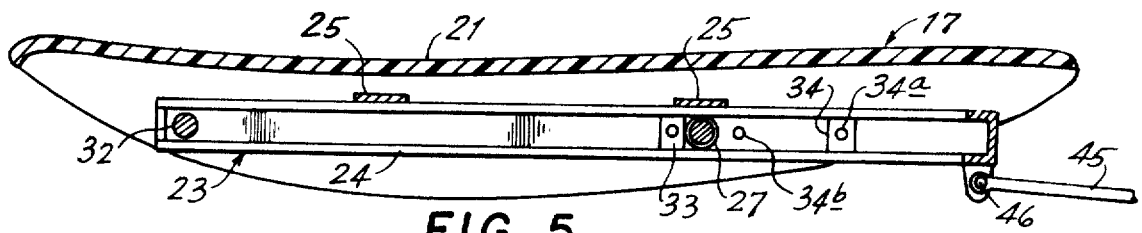
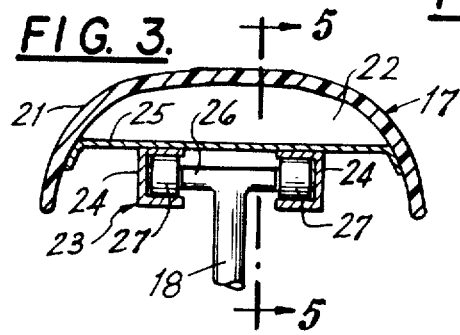
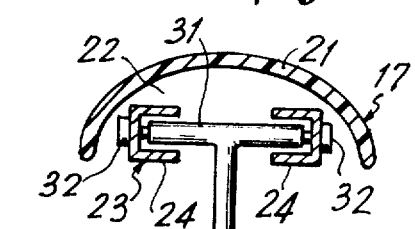
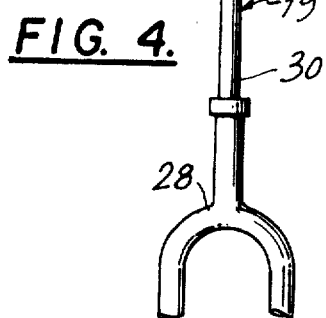
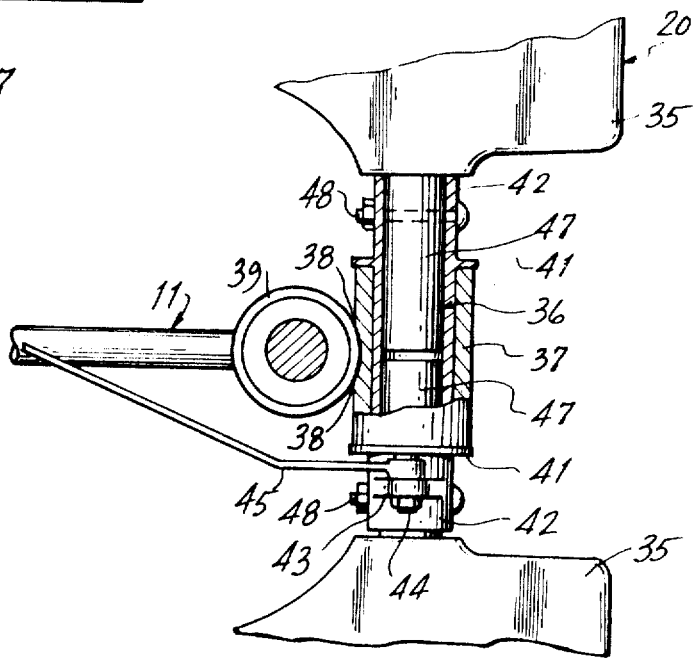
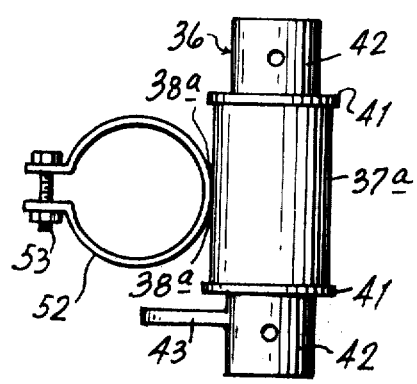
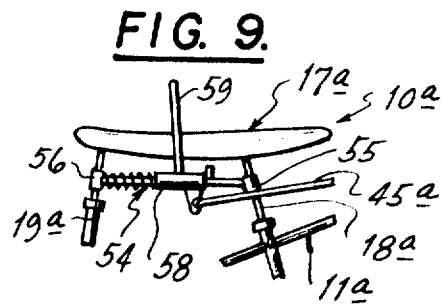
INVENTOR
NATHANIEL W. PRICE

PATENTED OCT 5 1971

INVENTOR
NATHANIEL W. PRICE
BY
ATTORNEY

3,610,660

BICYCLES AND ACCESSORIES THEREFOR

This invention relates generally to bicycles and accessories therefor, and more particularly is directed to bicycles of the type which may be balanced on the rear wheel alone while maintaining forward progress.

So-called sports-model bicycles have recently gained in popularity. Such bicycles are compact in that they employ relatively small wheels, and they are further characterized by elevated handlebars and an elongated seat along which the rider may move to shift his center of gravity. It is intended that when the rider moves rearwardly along the seat to similarly shift his center of gravity, pulling upwardly and rearwardly on the handlebars will be effective to raise the front wheel from the ground, and that thereafter the rider may balance on the rear wheel alone while maintaining forward progress. However, the described maneuver is not easily accomplished and considerable danger is involved in its execution. More specifically, in order to raise the front wheel in response to upward and rearward pulling on the handlebars, the rider must shift to an extreme rearward position on the seat so that his center of gravity is at, or to the rear of, a vertical plane through the axis of the rear wheel and, as the front wheel rises, the resulting tilting of the bicycle frame moves the rider's center of gravity still further to the rear. Therefore, after the front wheel has been raised, the rider has to shift slightly forward on the seat to prevent rearward toppling and maintain balance on the rear wheel alone. Since the immediately preceding movement of the rider's body has been in the rearward direction in connection with the rearward and upward pulling on the handlebars, it is difficult for the rider to effect the slight forward shift necessary to prevent rearward toppling without overcompensating and thereby returning the front wheel to the ground.

Accordingly, it is an object of this invention to provide a bicycle, for example, of the type described, which is constructed to facilitate the raising of its front wheel and the balancing of the bicycle on its rear wheel alone while maintaining forward progress.

Another object is to provide a bicycle, as aforesaid, which has a wing structure mounted on the forward portion of its frame and by which, when desired, the front wheel can be raised from the ground and maintained in such position in a relatively easy fashion.

Still another object is to provide a bicycle, as aforesaid, in which the wing structure and associated controls may be incorporated as original equipment on the bicycle or furnished as attachments for mounting on an existing bicycle.

A further object is to provide a bicycle, as aforesaid, in which the wing structure is constructed to avoid injury to persons or objects that may be struck thereby.

In accordance with an aspect of this invention, the wing structure mounted on the forward portion of the bicycle frame is pivotal relative to the latter for varying its angle of attack, and such angle of attack is varied in response to shifting of the rider's center of gravity on the bicycle seat either by actual displacement of the seat or by movement of the rider along the seat.

The above, and other objects, features and advantages of the invention, will be apparent in the following detailed description of illustrative embodiments thereof which is to be read in connection with the accompanying drawings, wherein.

Figure 1:
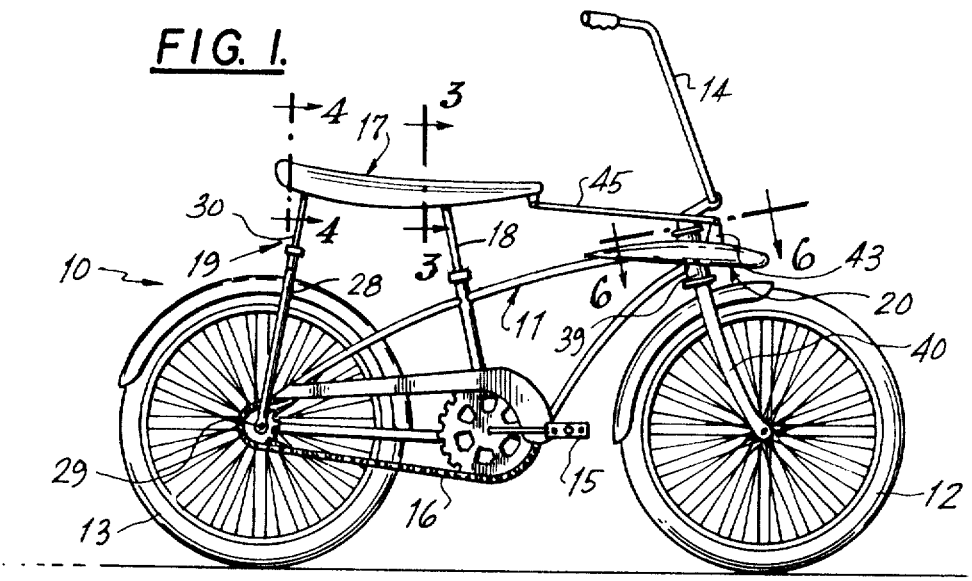
FIG. 1 is a side elevational view of a bicycle in accordance with one embodiment of this invention.
Figure 7:
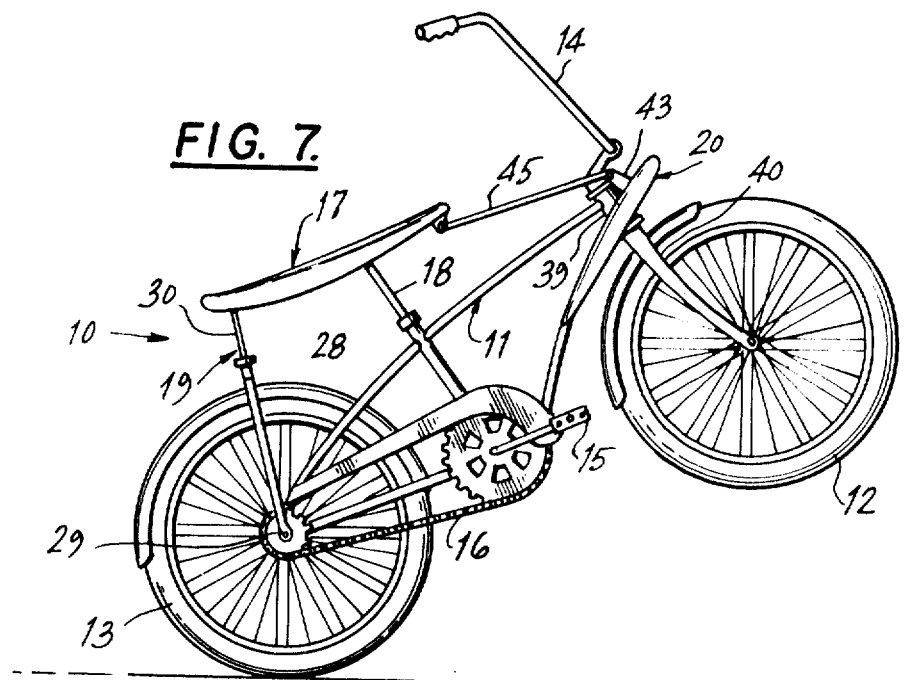
Figure 10:
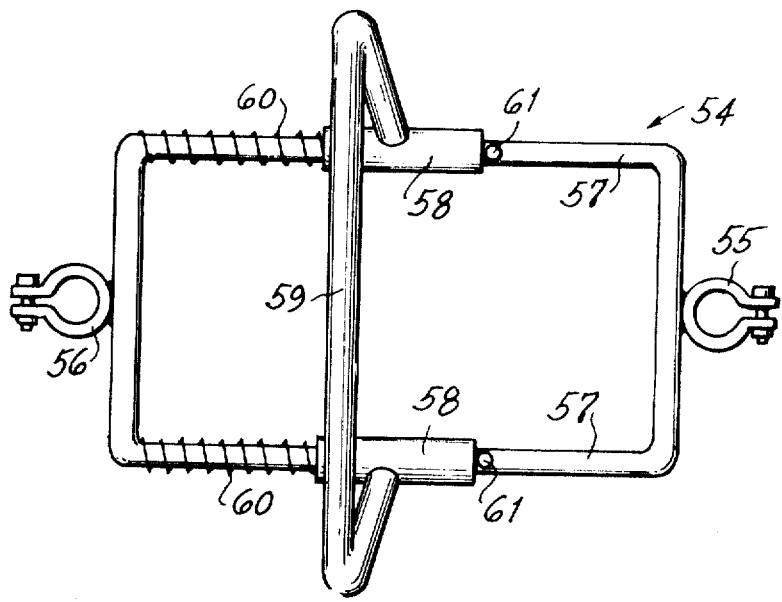

FIGS. 3 and 4 are, respectively, enlarged sectional views taken along the lines 3—3 and 4—4 on FIG. 1 and showing details of the mounting of the bicycle seat;

FIG. 5 is a longitudinal sectional view taken along the line 5—5 on FIG. 3;

FIG. 6 is a detail sectional view taken along the line 6—6 on FIG. 1 and illustrating the manner in which the wing structure is mounted on the forward portion of the bicycle frame;

FIG. 7 is a view similar to that of FIG. 1, but showing the bicycle with its front wheel raised from the ground so as to balance on the rear wheel alone;

FIG. 8 is a detail view showing an alternative mounting for the wing structure;

FIG. 9 is a fragmentary side elevational view showing a device for controlling the angle of attack of the wing structure which may be attached, as an accessory, to a bicycle having a fixedly positioned seat; and FIG. 10 is an enlarged top plan view of the accessory illustrated on FIG. 9.

Referring to the drawings in detail, and initially to FIG. 1 thereof, it will be seen that a bicycle 10 in accordance with this invention, shown to be of the compact, sports-model type, may generally comprise the usual frame 11, a steerable front wheel 12 and a rear wheel 13 rotatably secured to the frame, elevated handlebars 14 for steering the front wheel, pedals 15 for driving the rear wheel 13 through a chain and sprocket transmission 16, an elongated seat 17, and vertically adjustable front and rear seat supports 18 and 19 extending from the frame and on which seat 17 is mounted, as hereinafter described in detail. The bicycle 10 according to this invention further generally comprises a wing structure 20 (FIGS. 1 and 2) mounted, as hereinafter described, on the front portion of frame 11 and being pivotal with respect to the latter for varying the angle of attack of the wing structure relative to the frame, and means by which such angle of attack may be varied in response to shifting of the rider's center of gravity relative to the frame.

In the embodiment of the invention being presently described, shifting of the rider's center of gravity for varying the angle of attack of wing structure 20 is effected by actual longitudinal displacement of seat 17 relative to frame 11, that is, seat 17 is mounted on supports 18 and 19 so as to permit longitudinal displacement of seat 17 relative to frame 11. More specifically, as shown on FIGS. 3, 4 and 5, seat 17 may include a shell or body 21 molded of a suitably resilient plastic material so as to have a downwardly concave transverse cross-sectional shape for defining a space 22 at the underside of shell 21 within which a longitudinal frame 23 is disposed. The frame 23 may include laterally spaced apart, longitudinally extending channel members 24 opening toward each other and on which the shell 21 is suitably mounted, as by coil springs (not shown) or transverse leaf springs 25. The vertically adjustable front support 18 forms a rigid extension of frame 11 and, at its upper end, terminates in a crosspiece 26 extending laterally between channel members 24 and carrying rotatable rollers 27 at its ends for rolling engagement within channel members 24. The vertically adjustable rear support 19 has a forked lower portion 28 which, at its lower end, is pivotally mounted on the ends of rear axle 29 (FIG. 1), and an adjustably extensible upper portion 30 which, at its upper end, terminates in a crosspiece 31 extending between channel members 24 and pivotally connected to the latter, as at 32 (FIG. 4). Thus, the forward portion of frame 23 is movably mounted on rollers 27 and the rear end portion of the frame is pivotally mounted on the pivots 32 which are forwardly and rearwardly movable in connection with swinging of rear support 19 about rear axle 29 of the bicycle. In order to limit the forward and rearward displacement of seat 17 relative to frame 11, suitably positioned stops 33 and 34 (FIG. 5) may be suitably secured within channels 24 at spaced apart locations along the latter for selective engagement by rollers 27.

Figure 2:
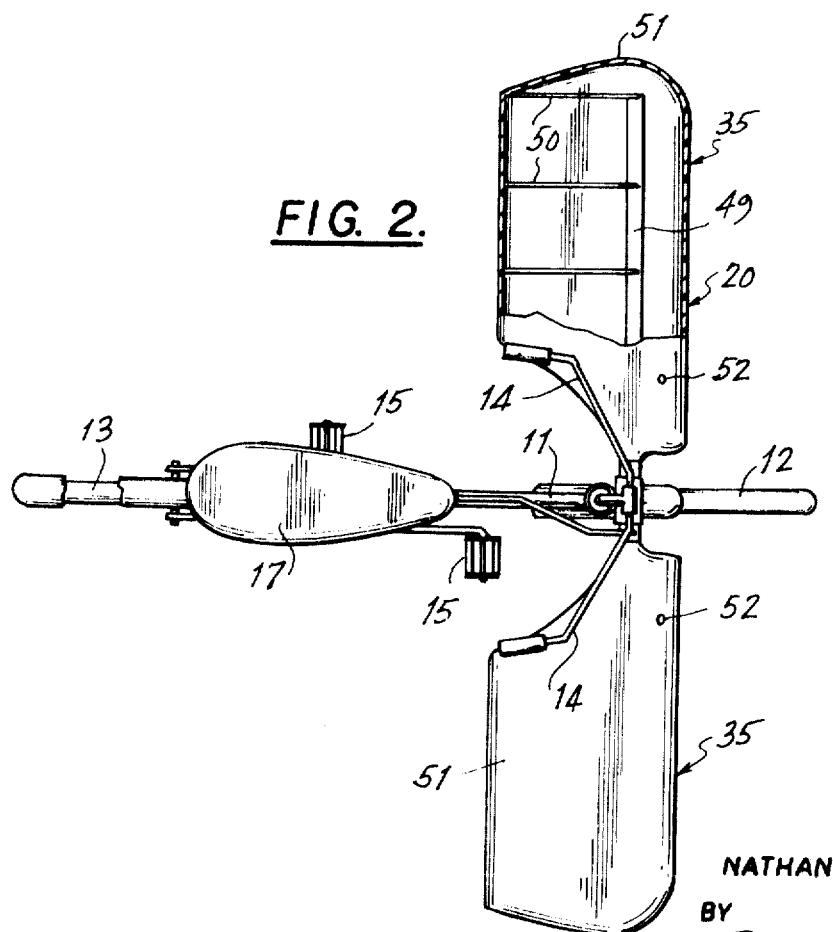
FIG. 2 is a top plan view of the bicycle with a portion of its wing structure having the skin thereof broken away.

Referring now to FIGS. 2 and 6, it will be seen that the wing structure 20 of the embodiment being described may comprise a pair of wings 35 extending laterally at opposite sides of the front portion of bicycle frame 11 and being preferably separably attached to a connecting tube 36 (FIG. 6). Tube 36 extends through, and is rotatably journaled in a laterally directed tubular bearing member 37 welded, as at 38, to the portion 39 of frame 11 in which the fork 40 carrying front wheel 12 is conventionally journaled for steering of the front wheel connecting tube 36 has outwardly directed flanges 41 to engage the ends of bearing member 37 and hold tube 36 against axial displacement relative to the bearing. End portions 42 of tube 36 project outwardly beyond flanges 41, and a crank arm 43 extends radially from one of end portions 42. Such crank arm 43 is pivotally connected, as at 44 (FIG. 6), to the forward end of a connecting rod 45 having its back end pivotally connected, as at 46 (FIG. 5), to the forward end of seat frame 23. Thus, when seat 17 is longitudinally displaced relative to bicycle frame 11, connecting rod 45 and crank arm 43 are effective to correspondingly rotate tube 36 about the axis of bearing member 37, and thereby to change the angle of attack of wings 35 with respect to the bicycle frame.

In the embodiment shown, crank arm 43 extends upwardly from tube 36 with seat 17 in its foremost position, and wings 35 are located with respect to tube 36 so as to have a minimum angle of attack when seat 17 is thus positioned. Accordingly, with seat 17 in its foremost position, a minimal lift is provided by wings 35 during forward progress of the bicycle, and, when seat 17 is displaced rearwardly, the resulting rearward movement of connecting rod 45 turns wing structure 20 about the axis of bearing member 37 in the direction to increase the angle of attack of wings 35 relative to the bicycle frame, for example, to the position shown on FIG. 7, whereby to substantially increase the lift provided by the wing structure in response to forward progress of the bicycle.

The wings 35 may be individually molded of a suitable plastic and provided with inwardly directed cylindrical extensions 47 (FIG. 6) which are slidable into tube 36 and secured in the latter, as by bolts 48 received in aligned holes formed in extensions 47 of the wings and end portions 42 of tube 36. Thus, wings 35 may be easily attached to bicycle 10 or removed therefrom. If it is desired to use bicycle 10 in a conventional manner, wings 35 are removed and seat 17 is suitably fixed to prevent its longitudinal displacement, for example, by removing stop 34 from the position shown on FIG. 5 and engaging its securing screw 34a in the topped hole 34b so that roller 27 is held tightly between stop 33 and relocated stop 34.

The wings 35 are preferably formed with softly resilient leading edge portions to avoid injury to persons or objects that may be struck thereby. In order to provide wings 35 with such softly resilient leading edge portions, each wing, as shown on FIG. 2, may be provided with a supporting structure constituted by a tubular spar 49, of which extension 47 is an integral part, and ribs 50 extending rearwardly from spar 49. The spar 49 and ribs 50 may be molded integrally of a suitably rigid plastic, and contained within an envelope or skin 51, for example, of a flexible plastic such as polyvinyl chloride sheeting, shaped and dimensioned to provide the wing with the desired configuration when such skin 51 is inflated, as through a valve 52. Since ribs 50 only extend rearwardly from spar 49 in each wing 35, it will be apparent that the leading edge portions and the wing tips are defined only by the inflated skin 51 and thus are softly resilient so as to yield easily when subjected to impact.

With the bicycle 10 as described above, the rider astride seat 17 maintains the latter in its foremost position when it is desired to propel the bicycle in its normal position, that is, with the bicycle balanced on both wheels 12 and 13. However, when it is desired to raise front wheel 12 and maintain forward progress while balancing on rear wheel 13 alone, the rider shifts his body rearwardly on seat 17 which undergoes a corresponding rearward displacement. Such rearward displacement of the rider on seat 17 effects a corresponding rearward displacement of the rider's center of gravity; and, by reason of the described connection of seat 17 to wing structure 20, the angle of attack of the wing structure is substantially increased whereby to increase the lift provided by the wing structure in response to the forward movement of the bicycle. In consideration of the rearward displacement of the rider's center of gravity, the increased lift of the angularly displaced wing structure 30 is sufficient to raise front wheel 12, as shown on FIG. 7, and thereafter the rider maintains the bicycle 10 balanced on rear wheel 13 alone merely by adjusting the position of his center of gravity for obtaining a precise balance of such position in relation to the lift provided by wing structure 20. Since the initiation of the upward movement of front wheel 12 does not require the exertion of an upward and rearwardly directed pull on handlebars 14, that is, the front wheel 12 is merely flown off the ground by the lift of wing structure 20, the rider is not required to effect abrupt changes in the direction of movement of his body; and, therefore, the danger of toppling rearwardly, or of overcompensating for the rearward tilting of the frame is avoided.

The bicycle 10 which has been described with reference to FIGS. 1–7 is intended to have the components according to this invention incorporated therein as original equipment, that is, the seat 17 is provided to be longitudinally displaceable relative to frame 11, rather than being adjustably fixed with respect to the latter as in conventional bicycles, and further the bearing member 37 for supporting wing structure 20 is welded to the bicycle frame. However, it is to be noted that the present invention may be embodied in accessories intended for mounting on an existing or conventional bicycle. Thus, for example, as shown on FIG. 8, the tubular bearing member 37a in which the connecting tube 36 of the wing structure is rotatable may be welded, as at 38a, to a split circular clamp 52 which is dimensioned to embrace the frame portion 39 of an existing conventional bicycle and be rigidly clamped thereto, as by tightening of the clamping bolt 53. Further, as shown on FIG. 9, an existing bicycle 10a having its elongated seat 17a fixed on the front and rear supports 18a and 19a of the frame 11a may be provided with a subframe 54 having split clamps 55 and 56 (FIGS. 9 and 10) adapted to be detachably clamped to supports 18a and 19a, respectively, underneath seat 17a. The illustrated subframe 54 is shown to have elongated, parallel side portions 57 on which sleeves 58 are longitudinally slidable, and a backrest 59 extends upwardly from sleeves 58 so as to extend over seat 17a when subframe 54 is clamped in position under the seat.

Coil springs 60 may be provided on side portions 57 of frame 54 to act on sleeves 58 and thereby urge backrest 59 to a forward position which is limited, for example, by pins 51 projecting from side frame members 57 and engageable by sleeves 58. Such pins 61 are located so that, when subframe 54 is installed on bicycle frame 11a, as shown on FIG. 9, backrest 59 in its foremost position will be disposed in back of a rider positioned astride seat 17a to dispose his center of gravity in a relatively forward position, as when the bicycle 10a is to be propelled with both of its wheels on the ground. A connecting rod 45a (FIG. 9) is pivotally connected, at its back end, to one of sleeves 58 and has its forward end (not shown) pivotally connected to the crank arm 43 extending from the assembly shown on FIG. 8 and which is detachably secured to the front of the bicycle frame.

With the embodiment of the invention illustrated on FIGS. 8, 9 and 10, the angle of attack of the wing structure is again varied in response to changing of the rider's center of gravity relative to frame 11a. However, in this instance, the change in the position of the rider's center of gravity is effected by displacement of the rider's body along the fixed seat 17a. It will be apparent that, as the rider moves rearwardly along seat 17a, the back rest 59 will be similarly displaced in the rearward direction and such rearward displacement of the backrest will, by reason of the connection of rod 45a to crank arm 43, effect an increase in the angle of attack of the wing structure relative to the bicycle frame. Thus, as previously described with reference to FIGS. 1 and 7, the combined action of the rearward movement of the rider's center of gravity and the increased angle of attack, and hence increased lift of the wing structure, will cause lifting of the front wheel of the bicycle from the ground so that the bicycle can be balanced on its rear wheel alone while continuing the forward progress thereof.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. The combination of a bicycle including a frame, front and rear wheels rotatably joined to the frame and a seat for a rider mounted on said frame and on which the rider can shift the position of his center of gravity forwardly and rearwardly with respect to the frame, a wing structure mounted on the forward portion of said frame and being pivotal relative to the latter for varying the angle of attack of said wing structure, and means operable to vary said angle of attack in response to forward and rearward shifting of the rider's center of gravity, so as to selectively raise said front wheel relative to said rear wheel.

2. The combination according to claim 1, in which said means to vary said angle of attack increases said angle in response to said rearward shifting of the rider's center of gravity so that the resulting increased lift provided by said wing structure and said rearward shifting of the rider's center of gravity combine to raise said front wheel.

3. The combination according to claim 2, in which said seat is longitudinally movable relative to said frame for said shifting of the rider's center of gravity, and said means to vary said angle of attack is connected between said seat and said wing structure to pivot the latter upon longitudinal movement of the seat.

4. The combination according to claim 2, in which said seat is fixed relative to said frame and is of substantial length along said frame so as to permit said shifting of the rider's center of gravity by movement of the rider along said seat, and said means to vary the angle of attack includes an actuating member mounted on said frame for movement lengthwise of said seat and extending above the latter so as to project into the path of rearward movement of a rider on said seat, and connecting means between said actuating member and said wing structure to convert movement of said actuating member into pivoting of said wing structure.

5. The combination according to claim 4, in which said means to vary the angle of attack and said wing structure are removably mounted on said frame.

6. The combination according to claim 1, in which at least the leading edge portion of said wing structure is softly resilient so as to avoid injury to anyone struck thereby.

7. The combination according to claim 6, in which at least said leading edge portion of the wing structure is constituted by an inflated plastic envelope.